United States Patent
Abraham et al.

(10) Patent No.: US 11,726,890 B2
(45) Date of Patent: *Aug. 15, 2023

(54) SYSTEM AND METHOD FOR DETECTING AND PREVENTING CHANGES IN BUSINESS-CRITICAL APPLICATIONS THAT MODIFY ITS STATE TO NON-SECURE AND/OR NON- COMPLIANT

(71) Applicant: Onapsis Inc., Boston, MA (US)

(72) Inventors: Sergio Javier Abraham, Ciudad Autonoma de Buenos Aires (AR); Juan Pablo Perez Etchegoyen, Ciudad Autonoma de Buenos Aires (AR); Alejandro Exequiel Becerra, Ciudad Autonoma de Buenos Aires (AR); Laura Soledad Cabrera, Ciudad Autonoma de Buenos Aires (AR); Erika Maria Sanchez Solis, Ciudad Autonoma de Buenos Aires (AR)

(73) Assignee: Onapsis, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,554

(22) Filed: Aug. 9, 2022

(65) Prior Publication Data

US 2022/0382870 A1    Dec. 1, 2022

Related U.S. Application Data

(63) Continuation of application No. 16/387,763, filed on Apr. 18, 2019, now Pat. No. 11,409,625.

(60) Provisional application No. 62/659,649, filed on Apr. 18, 2018.

(51) Int. Cl.
| | |
|---|---|
| G06F 15/173 | (2006.01) |
| G06F 11/30 | (2006.01) |
| H04L 9/40 | (2022.01) |
| G06F 21/51 | (2013.01) |
| G06F 21/57 | (2013.01) |

(52) U.S. Cl.
CPC ........ *G06F 11/3079* (2013.01); *G06F 11/302* (2013.01); *G06F 11/3051* (2013.01);
(Continued)

(58) Field of Classification Search
CPC ............... G06F 11/3079; G06F 11/302; G06F 11/3051; H04L 63/101
(Continued)

(56) References Cited

U.S. PATENT DOCUMENTS

| | | |
|---|---|---|
| 6,930,985 B1 | 8/2005 | Rathi et al. |
| 6,971,018 B1 | 11/2005 | Witt et al. |

(Continued)

OTHER PUBLICATIONS

Extended European Search Report dated Sep. 20, 2019 for Application No. 19170170.5.

*Primary Examiner* — Duyen M Doan
(74) *Attorney, Agent, or Firm* — Crowell & Moring LLP

(57) ABSTRACT

Systems and methods detect and prevent changes in business applications that modify its state to non-secure and/or non-compliant. A system may include a processor set up to perform: defining a compliant state of a computer software configuration, monitoring a state of the computer software configuration, detecting a change in the state of the computer software configuration, wherein the change causes a changed state, and comparing the compliant state and the changed state, wherein if the changed state conflicts with the compliant state, stopping the change.

20 Claims, 6 Drawing Sheets

(52) U.S. Cl.
CPC .............. *G06F 21/51* (2013.01); *G06F 21/57* (2013.01); *H04L 63/101* (2013.01); *H04L 63/105* (2013.01); *G06F 2221/033* (2013.01)

(58) Field of Classification Search
USPC ................................................ 709/203, 224
See application file for complete search history.

(56) References Cited

U.S. PATENT DOCUMENTS

| | | | |
|---|---|---|---|
| 7,607,164 | B2 | 10/2009 | Vasishth |
| 7,822,724 | B2 | 10/2010 | DiFalco et al. |
| 8,443,448 | B2 * | 5/2013 | Brando .................... G06F 8/61 713/153 |
| 2005/0154733 | A1 | 7/2005 | Meltzer |
| 2007/0006130 | A1 | 1/2007 | Stamler |
| 2009/0205011 | A1 | 8/2009 | Jain |
| 2009/0205012 | A1 | 8/2009 | Jain |
| 2010/0306017 | A1 | 12/2010 | Dreyfuss |
| 2012/0089960 | A1 | 4/2012 | Medvidovic |
| 2014/0137071 | A1 * | 5/2014 | Wadhwani ................ G06F 8/70 717/101 |
| 2014/0250427 | A1 * | 9/2014 | Wong ....................... G06F 8/73 717/126 |
| 2016/0147518 | A1 * | 5/2016 | Dimitrakos ............... G06F 8/60 717/120 |
| 2017/0060729 | A1 | 3/2017 | Kahl |
| 2017/0154189 | A1 | 6/2017 | Betzler |

\* cited by examiner

Setup Process

100

Definition of
Configuration
Policy

102

↓

Change
Detectors
Activation

SYSTEM AND METHOD FOR DETECTING AND PREVENTING CHANGES IN BUSINESS-CRITICAL APPLICATIONS THAT MODIFY ITS STATE TO NON-SECURE AND/OR NON- COMPLIANT

CROSS-REFERENCE TO RELATED APPLICATIONS

This application claims priority to U.S. application Ser. No. 16/387,763 filed on Apr. 18, 2019, now U.S. Pat. No. 11,409,625 issued on Aug. 9, 2022, which claims priority to U.S. Provisional Patent Application Ser. No. 62/659,649 filed on Apr. 18, 2018, both entitled "SYSTEM AND METHOD FOR DETECTING AND PREVENTING CHANGES IN BUSINESS-CRITICAL APPLICATIONS THAT MODIFY ITS STATE TO NON-SECURE AND/OR NON-COMPLIANT," both of which are herein incorporated by reference in its entirety.

BACKGROUND OF THE INVENTION

Companies may typically spend several months and millions of dollars securing their business-critical applications (BCAs) and enforcing the compliance of the business critical applications to standard policies, such as the Sarbanes-Oxley Act (SOX), the Payment Card Industry (PCI), the Health Insurance Portability and Accountability Act (HIPAA), the North American Electric Reliability Corporation (NERC), and others.

From the security standpoint, there is a risk of exposing the business critical application to threats that may compromise its confidentiality, integrity or availability. From the compliance standpoint, there is a serious monetary risk related to penalties when not complying with standard policies. This may change from industry to industry. In both scenarios, there is a significant monetary impact on the efforts spent to take the BCA to a desired state. The desired state refers to the general secure/compliant state of the BCA. Organizations prefer their systems/BCAs to be secure and protected, and to be compliant with required regulations. Reaching that desired state may incur high costs in terms of time and resources.

Sometimes administrators, developers and/or testers make changes in the BCA for their daily operations. As a result of this behavior, there is a risk of not only being non-secure or non-compliant again, but also of jeopardizing the previous investment around securing the system in the first place. Therefore, there is a need in the industry to address one or more of the abovementioned shortcomings.

BRIEF SUMMARY OF THE INVENTION

A system includes a processor configured to define a compliant state of a computer software configuration such as a software state, monitor a state of the computer software configuration, and detect a change in the state of the computer software configuration, where the change causes a changed state, and compare the compliant state and the changed state. If the changed state is distinct from the compliant state, the change is stopped.

One aspect of the present system and method may operate as part of the set of tools that administrators and business owners have in order to make their business critical applications secure and compliant to standard policies and regulations. The system and/or method may manage secure and compliant configurations from all the business critical applications and prevent undesired changes from happening.

Another aspect of a system of the present invention may include a processor set up to perform: defining a compliant state of a computer software configuration, monitoring a state of the computer software configuration, detecting a change in the state of the computer software configuration, wherein the change causes a changed state, and comparing the compliant state and the changed state, wherein if the changed state is distinct from the compliant state, stopping the change.

Another aspect of a method of the present invention may include defining a compliant state of a computer software configuration, monitoring a state of the computer software configuration, detecting a change in the state of the computer software configuration, wherein the change causes a changed state, and comparing the compliant state and the changed state, wherein if the changed state is distinct from the compliant state, stopping the change.

A typical user of the present system and method may include an administrator of the business critical applications. Based on requirements of a business, information security requirements and audit requirements, users may define baselines used to prevent changes from happening. It would be advantageous for current business applications to be extended in their technologies in order to stop the changes from happening. While current technologies may have a baseline and just perform periodic checks, the present system and method embed such checks into the business critical application and detect those changes before they occur.

BRIEF DESCRIPTION OF THE SEVERAL VIEWS OF THE DRAWING

FIG. 1 is a simplified flow chart of a set up process of an embodiment of the present invention.

DETAILED DESCRIPTION

Figure 2:
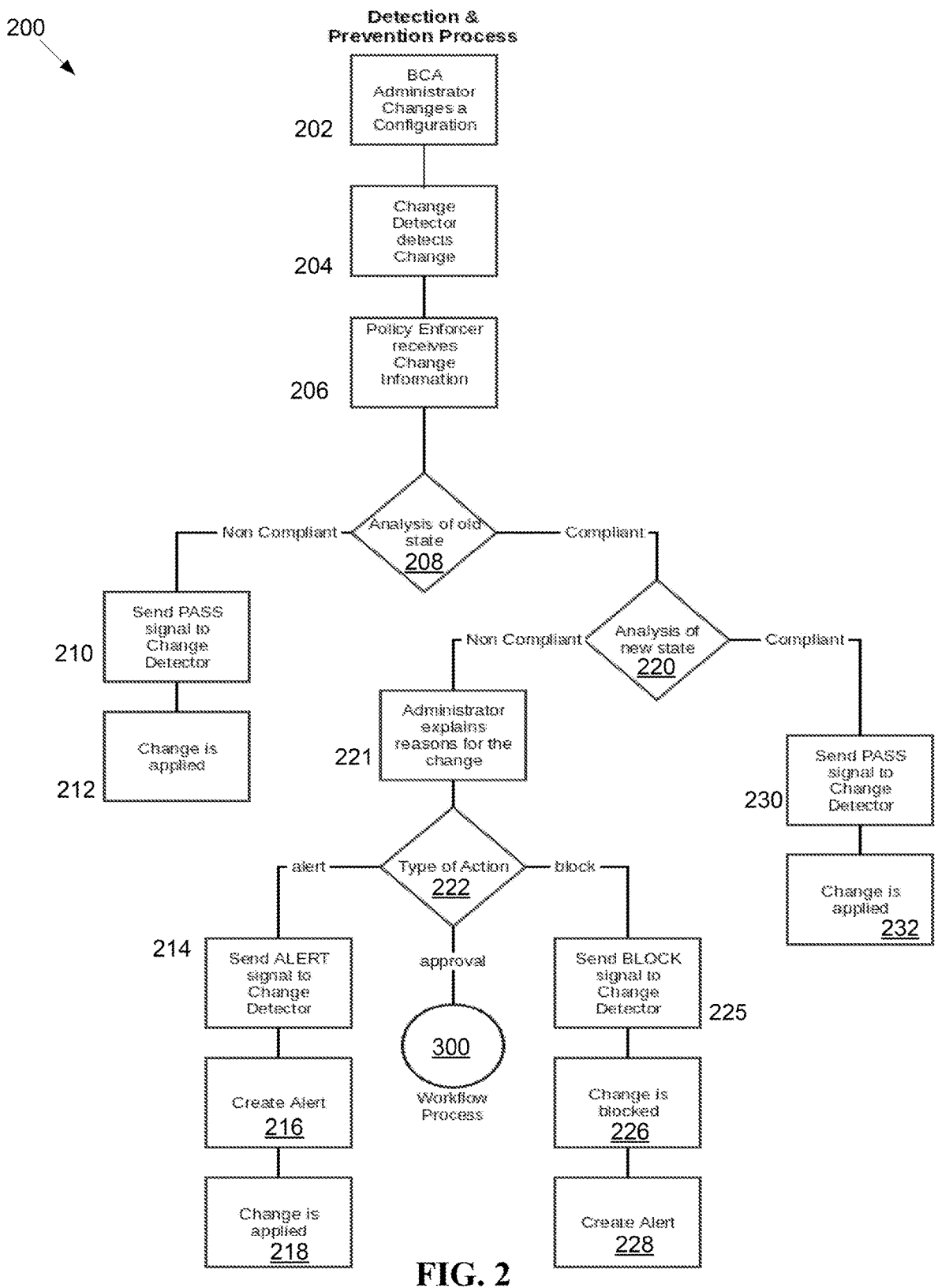
FIG. 2 is a flow chart of the detection and prevention process of an embodiment of the present invention.

Exemplary systems and methods are described for automatically detecting and blocking actions (or changes) that lead a business critical application (BCA) to a vulnerable or non-compliant state. As referred to herein, "action" refers to a configuration change to a business critical application and may refer to changing one or more of a parameter, a value in a table field, the content of a file, the activation/deactivation of certain features or services, among others. A mechanism that may detect such changes is embedded in the BCA and allows for monitoring any change, identifying those that change the system to a non-secure or non-compliant state, ultimately blocking these changes. If a user of the BCA attempts to apply an insecure change, an embodiment of the present system and method may stop the insecure change before it is implemented. Under the embodiments described herein, attempts to change BCA configurations to non-secure or non-compliant states may be blocked by a core component of the BCA. As referred to herein, the term "embedded" means that the core component able to detect the changes runs within the same business critical application the core component is monitoring. The embedded core component hooks into the application to monitor these changes in real time. An example of the core component includes a change detector, described further below.

As used herein, "real time" refers to a process that occurs concurrently with a triggering event. For example, a real time monitor detects an event upon occurrence of the event, as compared with a non-real time monitor that detects the event sometime after the occurrence of the event, for example, during a periodic scan.

As used herein, a "configuration change" generally refers to a proposed change to the configuration of a system, where the proposed change may or may not be implemented as an actual change to the system depending upon whether or not the proposed change and/or a resulting state change from implementation of the proposed change is determined to comply with a criteria and/or a compliance standard and/or policy. A proposed change to the system that results in a non-secure and/or non-compliant state is said to conflict with the compliant state.

A configuration change may be the change to a parameter or a table value or certain text in a file. A configuration change implies a change to the behavior of the BCA. A non-compliant/non-secure configuration change means the BCA will behave in a non-compliant/non-secure way after the change. For example, a parameter in a configuration file may be defined as: min_password_len=8 which means passwords must have 8 or more characters. Here, a proposed change to this parameter to lower than 8 characters would conflict with the compliant state, resulting in the proposed parameter change being blocked or generating an alert.

As used herein, a "signal" refers to a notification conveyed from a first system component to a second system component via a communication channel between the first and second system components. For example, a PASS signal may be the ASCII text string "PASS" encapsulated within a communication protocol on the communication channel between the first and second system components.

Examples of BCAs include, but are not limited to Enterprise Resource Planning (ERP), Customer Relationship Management (CRM), Supplier Relationship Management (SRM), Supply Chain Management (SCM), Product Lifecycle Management (PLM), Human Capital Management (HCM), Integration Platforms, Business Warehouse (BW)/Business Intelligence (BI) and Integration applications developed by SAP, ORACLE, MICROSOFT, SIEBEL, JD EDWARDS, PEOPLESOFT, and others.

A baseline definition system is used to define a secure or compliant state of a BCA. Embodiments of the present system and method may contain a component that allows the user to define secure/compliant states. A default (baseline) policy is also provided, whereas used herein a "policy" is a set of control points and a control point is a set of specific security/compliance checks. This default policy may be customized by the user to adjust secure/compliance states of the organization. A secure/compliant state refers to one specific type of configuration and the desired value or range of values. The Baseline/Policy definition system allows the user to adjust those desired values (security/compliance states). A defined baseline is used to compare a given change and make a decision based on the comparison, including, but not limited to: alert, block, and ask for approval. FIG. 1 is a simplified flow chart under a first embodiment of a method 100 of the present invention for a set up process. The method 100 of the setup process includes definition of a configuration policy (block 102) and activation of one or more change detectors (block 104), both of which are described further below.

Embodiments of the present system and method may enforce the compliance of a business critical application to a given policy. For example, if a BCA is already compliant to the Sarbanes Oxley Act of 2002 (SOX), any change to a configuration that would take the BCA out of the compliance state may be stopped.

An embodiment of the present system and method may enable a business owner to control and track changes to BCAs by detecting a change to the BCA, such as, but not limited to, a non-secure or non-compliant change, before the change happens.

Detecting a change in advance of deployment enables an embodiment of the present system and method to stop the changes from happening or taking any other action, such as forcing the user to add a comment on why he/she is performing that change and ask for diverse predefined approvals.

Currently, companies are able to perform periodic checks in order to determine if they are non-compliant or non-secure at a given moment. These periodic checks may accurately detect changes after they occurred but may not detect and prevent them before happening. Presently there may be no way to preemptively prevent such change. Administrators may always change configurations, and business owners may want to avoid any changes that may affect the business that introduce security threats or non-compliance penalties. Currently, business owners typically only realize if a change is made after it has been implemented, but they are not able to prevent it.

Figure 3:
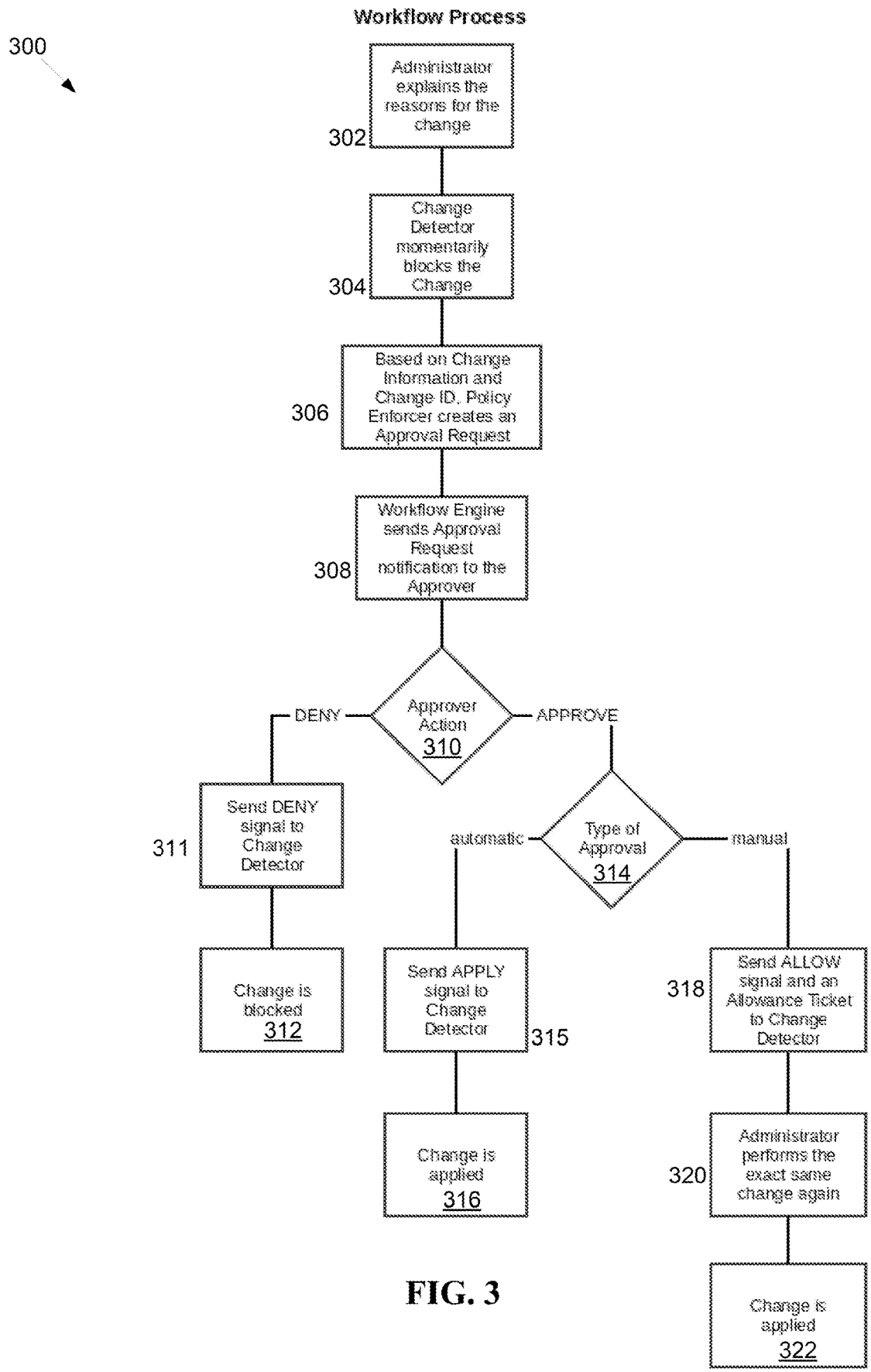
FIG. 3 is a flow chart of the workflow process of an embodiment of the present invention.

FIG. 2 is a first of two flow charts of the detection and prevention process of a second embodiment of a method 200 for monitoring a BCA. A second of the two flow charts 300 entitled "Workflow Process" is shown in FIG. 3. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The description of the processes of FIGS. 2 and 3 are made with reference to FIG. 4.

A configuration change 405 for a BCA 420 is received, for example, as a result of a (human) BCA administrator 401 entering the configuration change 405 via an administrator interface for the BCA 420, as shown by block 202. A change detector 430 detects the configuration change 405 in real time, as shown by block 204.

A change detector 430 may be thought of as a watcher, or an alarm detector.

Once the change detector 430 embedded in the BCA 420 is enabled, the change detector 430 is able to watch any activity being executed in the BCA 420 itself. The change detector 430 is instrumented to differentiate between any regular user activity and configuration changes. Whenever any activity is being performed by any user in the BCA 420, the change detector 430 determines if that activity is a configuration change or not. If that activity is a configuration change then the change information is sent to the policy enforcer as described below. The analysis performed by the change detector 430 analysis is transparent for the users performing the configuration changes, for example, the BCA administrator 401 for example.

A policy enforcer 440 receives change information 432 from the change detector 430 that includes the configuration change 405, as shown by block 206. Examples of change information 432 received by the policy enforcer 440 may include (but are not limited to):
- Timestamp of the change
- Username of the change
- BCA name (where the change was performed)
- reason for the change (if specified by the user)
- Type of change (parameter, table value, file, other)
- Configuration change data (depends on the type of change)
  - -if parameter
  - ---parameter name
  - ---old value
  - ---new value
  - -if table value
  - ---table name
  - ---table field
  - ---old value
  - ---new value
  - -if file
  - ---file name The policy enforcer 440 may receive both an old state and a new state of one or more parameters as a part of the change information 432. The policy enforcer 440 analyzes an existing (old) state, as shown by block 208. If the policy enforcer 440 determines that the old state is non-compliant, the policy enforcer sends a PASS action signal to the change detector 430, as shown by block 210, and the BCA 420 applies the configuration change 405, as shown by block 212. If the policy enforcer 440 determines that the old state is compliant, the policy enforcer 440 analyses a new state that would result if the configuration change 405 is implemented, as shown by block 220. If the policy enforcer 440 determines the new state to be non-compliant, the BCA administrator 401 explains the reasons for the change, as shown by block 221. The policy enforcer 440 generates a response action, as shown by block 222. The response action may be an alert, a block, or an approval request 446. For an alert, an ALERT signal is sent to the change detector 430, as shown by block 214, an alert is created as shown by block 216, and the BCA applies the configuration change 405, as shown by block 218. If the response action is a block, an BLOCK signal is sent to the change detector 430, as shown by block 225, the configuration change 405 is blocked (block 226) and an alert is created (block 228). For an approval request 446, the workflow process begins, as shown by block 300, also shown in further detail by FIG. 3 and described further below. If the analysis of a new state finds the new state compliant, a PASS signal is sent to the change detector 430, as shown by block 230 and the configuration change 405 is applied, as shown by block 232.

FIG. 3 is a flow chart of the workflow process of an embodiment of a method 300 of the present invention. As shown by FIG. 3, the change detector 430 receives an explanation for the configuration change 405 from the BCA Administrator 401, as shown by block 302, the change detector 430 momentarily blocks the configuration change 405, as shown by block 304, the policy enforcer 440 creates an approval request 446 based on the change information 432 and a change ID 434, as shown by block 306, and a workflow engine 470 generates and sends an approval request notification 446 to an approver 403, as shown by block 308. The approver 403, for example, a person interacting with the system 400 via a console 460, provides an approver action, as shown by block 310. If the approver action is "deny," a DENY signal is sent to the change detector 430 (block 311) and the configuration change 405 is blocked, as shown by block 312. The type of approval may be categorized as automatic or manual, as shown by block 314. If the approver action is "approve" under an automatic approval, an APPLY signal is sent to the change detector 430 (block 315) and the configuration change is applied, as shown by block 316. If the approver action is "approve" under a manual approval, the policy enforcer 440 sends an allowance ticket to the change detector 430, as shown by block 318. Subsequently, when the exact same configuration change 405 is received from the BCA administrator 401 again, as shown by block 320, the configuration change 405 is applied, as shown by block 322.

Figure 4:
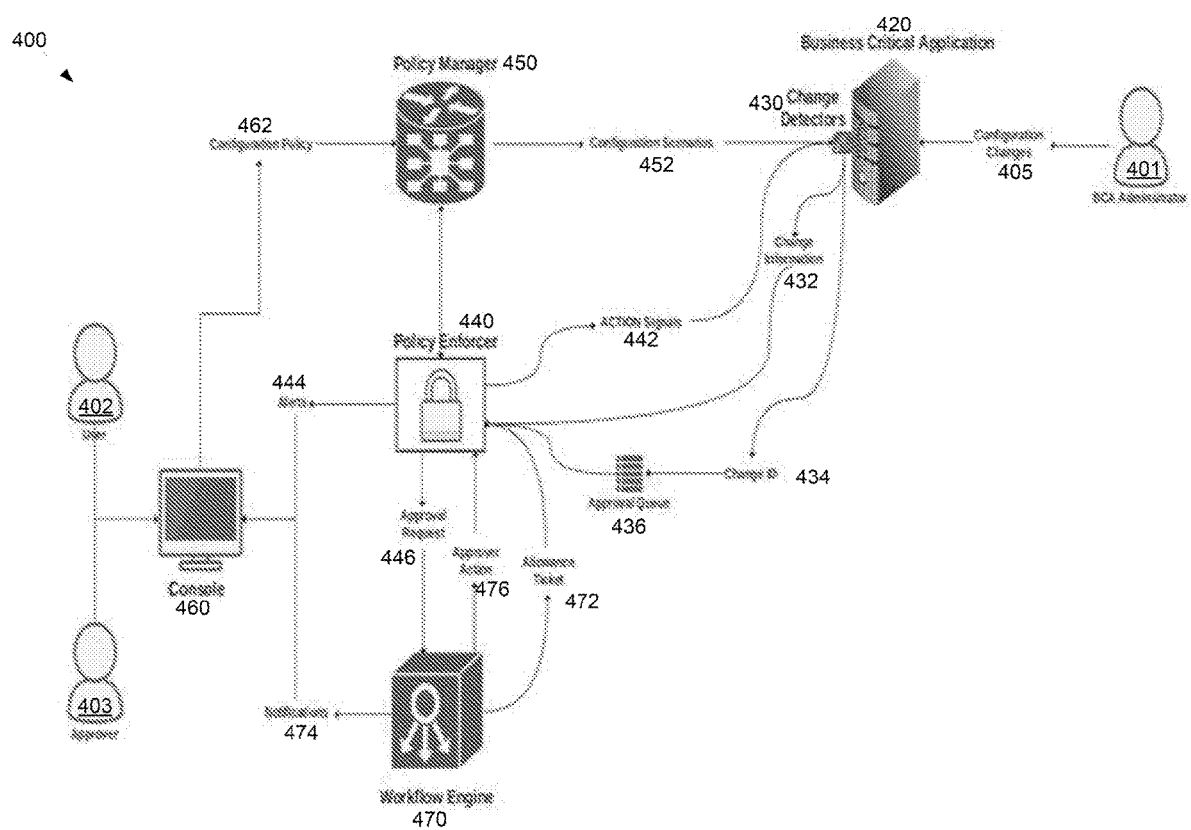
FIG. 4 is a schematic diagram illustrating an embodiment of the present system

Below, the methods of FIGS. 2 and 3 are described in more detail with reference to an exemplary embodiment of a system 400 shown in FIG. 4. A user 402 defines a configuration policy 462 via a console 460. The configuration policy 462 is sent to the policy manager 450. For example, a configuration policy 462 may be a set of defined configuration scenarios 452 (output from the policy manager 450 and sent to the BCA 420) with their expected values, examples of which include, but are not limited to:
- ■ password length>8
- ■ user lock after login failed<5
- ■ audit log=enabled
- ■ file access=read only
- ■ system type=production
- ■ interface credentials=empty
- ■ Interface encryption=ON
- ■ service acl content=list of internal IP addresses Each of these configuration scenarios 452 represents one specific configuration and the expected desired value in the BCA 420. The user 402 may group these configurations in one of several ways, for example, by compliance standard (SOX, GDPR, PCI, others), by team (Information Security, Audit & Compliance, Administrators, others), by technical category (Interfaces, Password Policy, Audit & Logging, others), or others.

The user 402 defines, for each available configuration scenario 452 in a configuration policy, a desired value and an action to be performed in case of misconfiguration, for example, alert only, alert and block, and ask for approval. In addition, the user 402 defines the target BCA 420 for the configuration policy 462. Configuration policies 462 may differ for different BCAs 420, for example production systems versus development systems, or systems in the United States versus systems in Europe. Once everything is configured, the change detectors 430, for example change detectors 430 embedded in the BCA 420, wait passively for new configuration attempts in the BCA 420. For each configuration scenario 452 there may be one corresponding change detector 430. Alternatively, a change detector 430 may detect multiple configuration scenarios 452.

When a user of the BCA (hereafter "BCA administrator") tries to modify any of the configuration scenarios, the corresponding change detector 430 for that configuration scenario 452 sends the change information 432 to the policy enforcer 440 (path shown in FIG. 4) for analysis. Change information (CI) 432 refers to the information from a given configuration scenario used by the policy enforcer 440 to make a decision. In some scenarios the change information 432 may be only the configuration change 405 (BCA administrator 401 to BCA including change detectors 430), the old value and the new value. In other scenarios the change information 432 may also contain contextual information needed to analyze if the change is allowed or not.

The policy enforcer 440 receives the change information 432 which includes, for example, at least the configuration scenario 452, the old state, and the new state. When appropriate, additional contextual information may also be received as part of the change information 432. The policy enforcer 440 analyzes the change information 432 to make a decision, as described further below.

The policy enforcer 440 may determine if a given configuration is compliant and/or secure by comparing values between the predefined configuration policy and the change information 432. For example, returning to the example of change information used above, the configuration policy 462 contains the definition: password length>8. When the change information 432 contains a change to the password length parameter, the policy enforcer 440 analyzes both old values and new values by comparing values. For example, an old password length value of 10 would be compliant, while a new password length value of 7 would be non-compliant. Similarly, an old value of 7 would be non-compliant, while a new value of 8 would be compliant. As another example, an old value of 6 would be non-compliant, and a new value of 7 would likewise be non-compliant If the policy enforcer 440 determines that the old state is not secure (for example, the old state does not comply with the corresponding configuration policy 462), the change does not require any further analysis and a "PASS" signal ("ACTION Signals" path from the policy enforcer 440 to the change detector 430) is sent to the change detector 430. Additionally, the change may be logged.

If the policy enforcer 440 determines that the old state is secure (complies with the corresponding configuration policy 462), the policy enforcer 440 checks the new state. If the policy enforcer 440 determines that the new state is secure (for example, the new state complies with the corresponding configuration policy 462), the change does not undergo further analysis and a PASS signal ("ACTION Signals" path from the policy enforcer 440 to the change detector 430) is sent to the change detector 430. The change may be logged.

If the policy enforcer 440 determines that the new state is not secure (does not comply with the corresponding configuration policy 462), the policy enforcer 440 triggers a corresponding action for that configuration scenario 452. Actions may include an alert action, a block action, and an approval action, described further below.

For an alert action, an ALERT signal is sent to the change detector 430 via an ACTION signals path 442 from the policy enforcer 440 to the change detector 430. The change detector 430 receives the ALERT signal from the policy enforcer 440 and presents a new window to the BCA administrator 401 requesting an explanation for the configuration change 405. The explanation provided by the BCA administrator 401 is sent to the policy enforcer 440 and the policy enforcer 440 creates and sends an Alert to the console 460 via an alerts path 444 where it is logged. An alert generally includes, for example, the configuration scenario 452, the target BCA, the old state, the new state, the user who performed the change, the timestamp, the corresponding configuration policy 462, and the explanation provided by the BCA Administrator 401. Finally, the change detector 430 allows the change to be applied.

For a block action, a BLOCK signal is sent to the change detector 430 via the ACTION signals path 442 from the policy enforcer 440 to the change detector 430. The change detector 430 receives the BLOCK signal from the policy enforcer 440 and provides the BCA administrator 401 an explanation why this action was blocked and suggested next steps, for example, by presenting the information to the BCA administrator 401 via a window on a user interface. The change detector 430 blocks the change and the new value is discarded. The policy enforcer 440 creates and sends an alert to the console 460 via the alerts path 444 where it is logged.

For an approval action, an APPROVAL signal is sent to the change detector 430 via the ACTION signals path 442 from the policy enforcer 440 to the change detector 430. The change detector 430 receives the APPROVAL signal from the policy enforcer 440 and requests an explanation from the BCA administrator 401 for this change. The change detector 430 momentarily blocks the change and generates a change ID 434 that is put into the Approval Queue 436 between the change detector 430 and the policy enforcer 440. The change detector 430 sends the change ID 434 along with the change information 432 to the policy enforcer 440 via the approval queue 436, and the policy enforcer 440 creates an approval request 446 that is sent to the workflow engine 470. The workflow engine 470 receives the approval request 446 and sends a notification via a Notifications path 474 from the workflow engine 470 to the approver 403 (via to the console 460). If the approver 403 (connected to the console 460) denies the approval request 446, the policy enforcer 440 sends a "DENY" signal via the ACTION signals path 442 from the policy enforcer 440 to the change detector 430 to block and discard the previously queued change. The change ID 434 is discarded, and the change is logged. The approver 403 may approve the approval request 446 in at least two different ways. First, the approver 403 approves and applies the change via approver action path 476 between the workflow engine 470 and the policy enforcer 440. Here, the policy enforcer 440 sends an APPLY signal via the ACTION signals path 442 from the policy enforcer 440 to the change detector 430 associated with the corresponding change ID 434. The change is unlocked and automatically applied. The change ID 434 is discarded, and the change is logged. Alternatively, the approver 403 opens an allowance ticket via an allowance ticket path 472 from the workflow engine 470 to the policy enforcer 440 for the BCA administrator 401 to apply the change. Here, the policy enforcer 440 sends an "ALLOW" signal via the ACTION Signals path 442 from the policy enforcer 440 to the change detector 430 along with the allowance ticket. The allowance ticket is created by the workflow engine 470 via the allowance ticket path 472 from the workflow engine 470 to the policy enforcer 440.

An allowance ticket, for example, a data structure or a pointer to a data structure, includes a change ID 434, a configuration scenario 452, the old state, the new state, a BCA Administrator username, a BCA Administrator IP address, and a time frame. This allowance ticket allows the same BCA administrator 401 to perform (repeat) the exact same change during a specific period of time. After the change is applied by the BCA administrator 401, the allowance ticket and change ID 434 are both discarded, and the change is logged. The console 460 may be configured to show the user 402 a full list of alerts and a list of approval requests.

The above embodiment may be implemented, for example, as part of a Vulnerability and Compliance (V&C) assessment tool. When, a V&C tool or a similar tool performs an assessment, the results that are categorized as Compliant or No Risk may be selected to be enforced. This means, for all the configuration checks that were determined to be secure/compliant by a V&C tool, a configuration policy 462 may be automatically created based on those results, creating the configuration scenarios 452 based on the configuration checks that were defined as secure/compliant.

Figure 5:
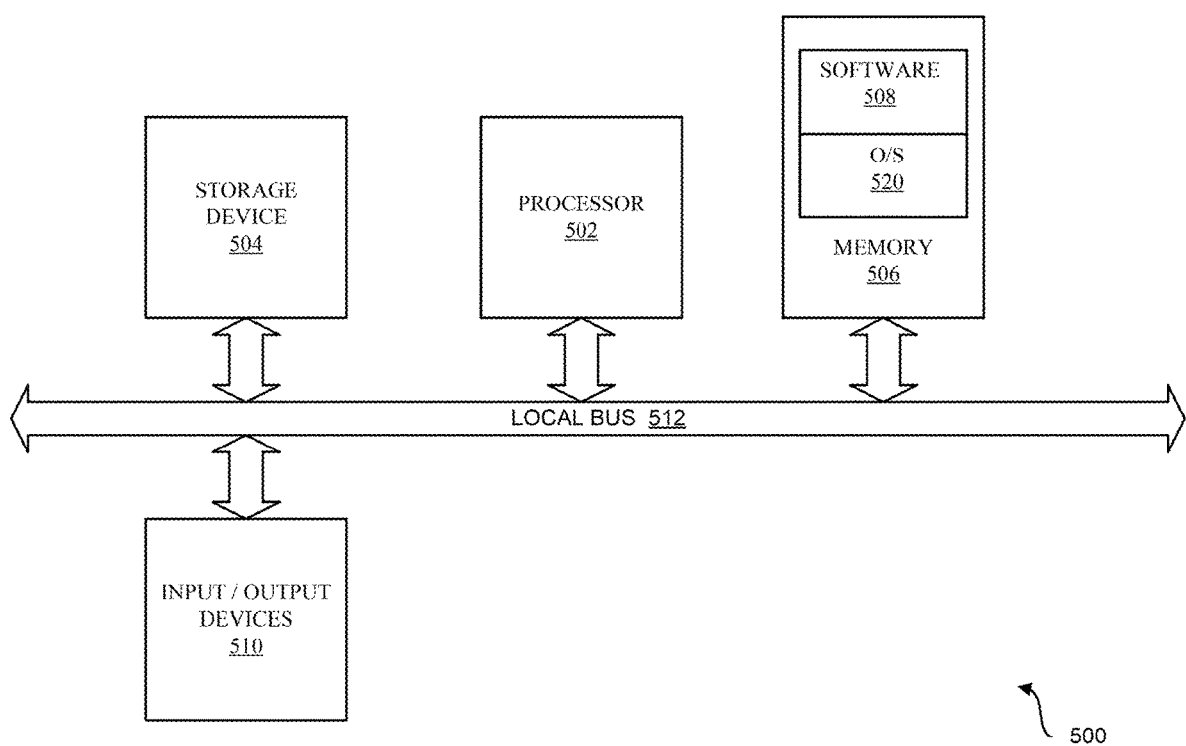
FIG. 5 is a block diagram of a computer having a processor for an embodiment of the present system

The functionality described above may be implemented by or include two or more computers. The policy manager 450, the policy enforcer 440, the workflow engine 470, and/or the console 460 may be (or include) a separate computer, an example of which is shown in the schematic diagram of FIG. 5. The change detectors 430 may be (or include) one or more separate computers where the BCA 420 resides. The change detectors 430 are preferably deployed in the same computer or computers where the BCA 420 is running (although other configurations may be used), regardless of how many computers the BCA 420 is using, an example of which is shown in the schematic diagram of FIG. 4. There may be hundreds of change detectors 430, where each detects one specific configuration in one BCA 420. These change detectors 430 reside in the BCA 420, therefore they may be unique components physically separated from the rest. The change detectors 430 send the information about changes to the separate computer where the rest of software modules reside.

The system 500 contains a processor 502, a storage device 504, a memory 506 having software 508 stored therein that defines the above mentioned functionality, input and output (I/O) devices 510 (or peripherals), and a local bus, or local interface 512 allowing for communication within the system 500. The local interface 512 may be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 may be any custom made or commercially available single core or multi-core processor, a central processing unit (CPU), an auxiliary processor among several processors associated with an embodiment of the present system 500, a semiconductor based microprocessor (in the form of a microchip or chip set), a macro-processor, or generally any device for executing software instructions.

The memory 506 may include any one or combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory 506 may incorporate electronic, magnetic, optical, and/or other types of storage media. Note that the memory 506 may have a distributed architecture, where various components are situated remotely from one another, but may be accessed by the processor 502.

The software 508 defines functionality performed by the system 500, in accordance with an embodiment of the present invention. The software 508 in the memory 506 may include one or more separate programs, each of which contains an ordered listing of executable instructions for implementing logical functions of the system 500, as described below. The memory 506 may contain an operating system (O/S) 520. The operating system may control the execution of programs within the system 500 and provides scheduling, input-output control, file and data management, memory management, and communication control and related services.

The I/O devices 510 may include input devices, for example, but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of 10 the system 500 pursuant to the software 508. The operating system 520 is read by the processor 502, perhaps buffered within the processor 502, and then executed.

When the system 500 is implemented in software 508, it should be noted that instructions for implementing the system 500 may be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that may contain or store a computer program for use by or in connection with a computer-related device, system, or method. Instructions for implementing the system may be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that may fetch the instructions from the instruction execution system, apparatus, or device and execute the instructions. In the context of this document, a "computer-readable medium" may be any means that may store, communicate, propagate, or transport the program for use by or in connection with the processor or other such instruction execution system, apparatus, or device.

Such a computer-readable medium may be, for example but not limited to, an electronic, magnetic, optical, electromagnetic, infrared, or semiconductor system, apparatus, device, or propagation medium More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program may be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In an embodiment of the system 500 (FIG. 5), the system 500 may include a processor 502 set up to perform: defining a compliant state of a computer software configuration, monitoring a state of the computer software configuration, detecting a change in the state of the computer software configuration, wherein the change causes a changed state, and comparing the compliant state and the changed state, wherein if the changed state is distinct from and/or conflicts with the compliant state, stopping the change.

The processor 502 may be further set up to require inclusion of a comment describing a reason of the change. The processor 502 may be further set up to require at least one approval for the change.

The processor 502 may be further set up to generate one or more of an alert or a block to the change if the changed state is distinct from and/or conflicts with the compliant state.

The processor 502 may be further set up to define one or more configuration policies. The configuration policies may include one or more of configuration scenarios of password length, user lock after login failed, audit log, file access, system type, interface credentials, interface encryption, and service acl content. Further, each of the one or more configuration scenarios may have a predetermined value and an action corresponding to the predetermined value.

In the system 500, a user may define a priority to the one or more configuration policies. The processor 502 may be further set up to detect a change in a configuration scenario, the change generating a change information analyzed by a policy enforcer, wherein the change information may include the configuration scenario, an old state, and a new state. Further, if the new state is less secure compared to a security level of the old state, the policy enforcer may send at least one of pass, alert, block, approval, deny, and allow signals to a change detector tasked with detecting the change.

In association with a computer-readable medium 504 or 506, having a non-volatile memory, the processor 502 and a program (such as software 508 (FIG. 5)) stored on the non-volatile memory, the program encompassing the methods depicted in at least one of FIGS. 2, 3, 4, and 6, wherein when the program is executed, the processor 502 is set up to perform: defining a compliant state of a computer software configuration, monitoring a state of the computer software configuration, detecting a change in the state of the computer software configuration, wherein the change causes a changed state, and comparing the compliant state and the changed state, wherein if the changed state is distinct from and/or conflicts with the compliant state, stopping the change.

Figure 6:
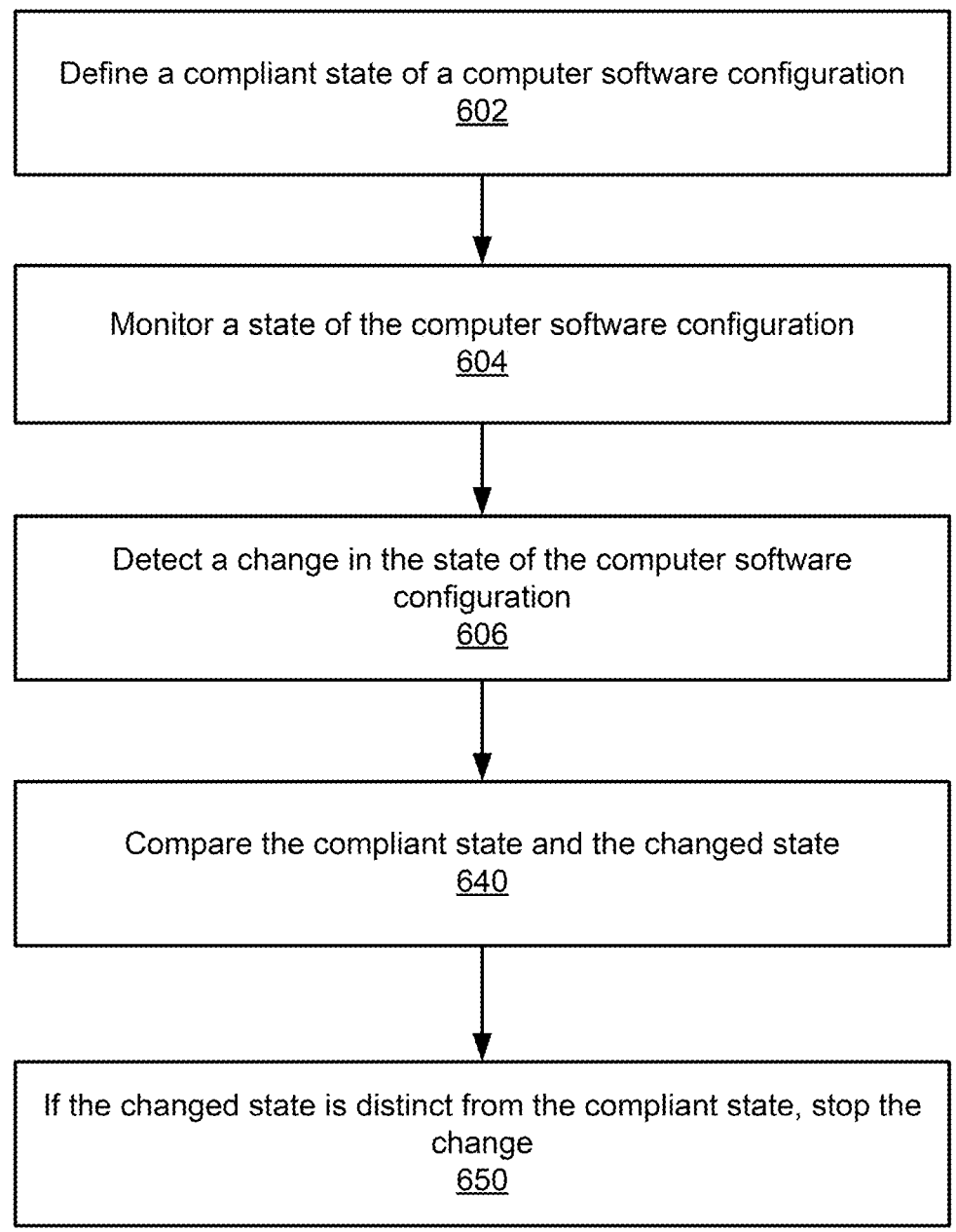
FIG. 6 is a block diagram of an embodiment of a method of the present invention.

As shown in FIG. 6, an embodiment of a method 600 of the present invention may include: defining a compliant state of a computer software configuration (block 602), monitoring a state of the computer software configuration (block 604), detecting a change in the state of the computer software configuration, wherein the change causes a changed state (block 606), and comparing the compliant state and the changed state (block 608), wherein if the changed state is distinct from and/or conflicts with the compliant state, stopping the change (block 610).

The method 600 may further include requiring inclusion of a comment describing a reason for the change. The method 600 may further include requiring at least one approval for the change. The method 600 may further include generating one or more of an alert or a block to the change if the changed state is distinct from and/or conflicts with the compliant state.

The method 600 may further include defining one or more configuration policies. The one or more configuration policies may include one or more of configuration scenarios of password length, user lock after login failed, audit log, file access, system type, interface credentials, interface encryption, and service acl content. Each of the one or more configuration scenarios may have a predetermined value and an action corresponding to the predetermined value. Still further, a user may define a priority to the one or more configuration policies.

The method 600 may further include detecting a change in a configuration scenario, the change generating a change information analyzed by a policy enforcer, wherein the change information includes the configuration scenario, an old state, and a new state.

The embodiments described above advantageously allow business owners to leverage the benefits of previous efforts to keep BCA system in a secure state, and avoid the waste of resources and money put into these business critical applications. It is recognized that modifications and variations of the invention will be apparent to those of ordinary skill in the art and it is intended that all such modifications and variations be included within the scope of the appended claims.

We claim:

1. A system comprising a processor and a memory configured to store non-transitory instructions, that when executed by the processor:

receive a compliant state of a software configuration;

analyze the compliant state to confirm compliancy;

monitor a state of the software configuration;

detect, based on the monitoring, a proposed change of the state of the software configuration;

compare the compliant state and the proposed changed state to determine whether the proposed changed state results in a non-compliant state that conflicts with the compliant state; and implement the proposed change depending on the comparison and the determination of whether the proposed changed state results in a non-compliant state that conflicts with the compliant state.

2. The system of claim 1, wherein for the implementation the processor is further configured to:

stop the proposed change of state based on the comparison when the proposed changed state conflicts with the compliant state and require additional approval for the proposed change of state to be implemented; and apply the proposed change based on the comparison when the changed state does not conflict with the compliant state.

3. The system of claim 2, the processor s further configured to:
require the additional approval for the proposed change of state to be implemented when the proposed changed state conflicts with the compliant state based on the comparison.

4. The system of claim 3, wherein the additional approval is received from a user.

5. The system of claim 3, wherein the processor is further configured to:
generate an alert or a block to the proposed change when the proposed changed state conflicts with the compliant state based on the comparison.

6. The system of claim 2, wherein the processor is further configured to receive a comment describing a reason for the proposed change.

7. The system of claim 2, wherein the processor is further configured to:
receive a configuration policy comprising a configuration scenario.

8. The system of claim 7, wherein the configuration scenario includes at least one of a password policy configuration, an audit log configuration, a file access definition, a system type definition, an interface security configuration, and a service access control list definition.

9. The system of claim 7, wherein the configuration scenario has a predetermined value and an action corresponding to the predetermined value.

10. The system of claim 7, further comprising the step of assigning a priority to the one or more configuration policies.

11. The system of claim 2, wherein the processor is further configured to:
detect a change in a configuration scenario based on the monitoring; and
generate a change information that is analyzed by a policy enforcer, wherein the change information includes the configuration scenario, an old state, and a new state.

12. The system of claim 11, wherein the processor is further configured to:
compare the new state with the old state, wherein based on the comparison, the policy enforcer sends at least one of a pass signal, an alert signal, a block signal, an approval signal, a deny signal, and an allow signal to a change detector configured to detect the change.

13. A computer implemented method comprising:
receiving an old state of a software configuration;
determining whether the old state is a compliant state;
monitoring, upon determining that the old state is a compliant state, a state of the software configuration, wherein the monitoring is continuous upon the determination;
detecting, based on the monitoring, a proposed change of the software configuration, wherein the proposed change causes a new state of the software configuration;
comparing the old state when it is determined to be a compliant state with the new state to determine whether the new state is compliant;
stopping, when the new state conflicts with the old state based on the comparing, the proposed change and require further approval in order for the proposed change to be implemented; and
applying the proposed change when, based on the comparing, the new state does not conflict with the old state.

14. The method of claim 13, further comprising:
receiving a comment describing a reason for the proposed change as part of the further approval.

15. The method of claim 13, wherein the stopping further comprises:
receiving the further approval from a user for the proposed change.

16. The method of claim 13, further comprising:
generating an alert or a block to the change when the proposed changed state conflicts with the old state.

17. The method of claim 13, further comprising:
receiving a configuration policy comprising a configuration scenario.

18. The method of claim 17, wherein the configuration scenario includes at least one of a password policy configuration, an audit log configuration, a file access definition, a system type definition, an interface security configuration, and a service access control list definition.

19. The method of claim 17, wherein each of the configuration scenarios has a predetermined value and an action corresponding to the predetermined value, further wherein a user defines a priority to the configuration policy.

20. A computer implemented method comprising:
monitoring a software configuration scenario to determine whether an old state for the software configuration scenario is compliant;
detecting a change in the software configuration scenario based on the monitoring, wherein the change comprises a new state of the software configuration scenario;
generating a change information comprising the software configuration scenario, the old state, and the new state;
sending, based on the change information, a pass signal when the new state is compliant and applying the new state;
sending, based on the change information, an alert signal when the new state is conflicting with the old state and the new state is not applied; and
sending, based on the change information, an approval signal when the new state is conflicting with the old state, wherein the approval signal requires an additional user approval in order for the new state to be applied.

* * * * *